United States Patent
Doke et al.

(10) Patent No.: US 12,469,221 B2
(45) Date of Patent: Nov. 11, 2025

(54) MEDICAL IMAGE PROCESSING DEVICE, MEDICAL IMAGE PROCESSING METHOD, MEDICAL IMAGE PROCESSING PROGRAM, AND SURGICAL SUPPORT SYSTEM

(71) Applicants: KOMPATH, INC., Tokyo (JP); The University of Tokyo, Tokyo (JP)

(72) Inventors: Takehito Doke, Tokyo (JP); Haruaki Takahashi, Tokyo (JP); Toki Saito, Tokyo (JP); Taichi Kin, Tokyo (JP); Hiroshi Oyama, Tokyo (JP); Nobuhito Saito, Tokyo (JP)

(73) Assignees: KOMPATH, INC., Tokyo (JP); The University of Tokyo, Tokyo (JP)

( * ) Notice: Subject to any disclaimer, the term of this patent is extended or adjusted under 35 U.S.C. 154(b) by 289 days.

(21) Appl. No.: 18/029,029

(22) PCT Filed: Sep. 28, 2020

(86) PCT No.: PCT/JP2020/036704
§ 371 (c)(1),
(2) Date: Mar. 28, 2023

(87) PCT Pub. No.: WO2022/064711
PCT Pub. Date: Mar. 31, 2022

(65) Prior Publication Data
US 2023/0386139 A1    Nov. 30, 2023

(51) Int. Cl.
*G06T 19/00*    (2011.01)
*A61B 90/00*    (2016.01)
(Continued)

(52) U.S. Cl.
CPC .............. *G06T 19/00* (2013.01); *A61B 90/37* (2016.02); *G06T 7/73* (2017.01); *G06V 20/70* (2022.01);
(Continued)

(58) Field of Classification Search
None
See application file for complete search history.

(56) References Cited

U.S. PATENT DOCUMENTS

| | | |
|---|---|---|
| 2015/0206346 A1* | 7/2015 | Oh ........................ A61B 6/468 345/419 |
| 2018/0160996 A1 | 6/2018 | Lee et al. |
| 2021/0128113 A1 | 5/2021 | Kim et al. |

FOREIGN PATENT DOCUMENTS

| | | |
|---|---|---|
| EP | 2620885 A2 | 7/2013 |
| JP | H08-106546 A | 4/1996 |

(Continued)

OTHER PUBLICATIONS

International Search Report issued in corresponding International Application No. PCT/JP2020/036704 dated Nov. 2, 2020.

*Primary Examiner* — Tapas Mazumder
(74) *Attorney, Agent, or Firm* — Morgan, Lewis & Bockius LLP

(57) ABSTRACT

A medical image processing device acquires a user operation. The medical image processing device specifies, from a three-dimensional medical image in which one or more organs appear, an organ of interest to which to apply information. The medical image processing device applies predetermined information to the organ of interest that has been specified. The medical image processing device controls a display device so as to display the three-dimensional medical image.

17 Claims, 7 Drawing Sheets

(51) Int. Cl.
  *G06T 7/73* (2017.01)
  *G06V 20/70* (2022.01)
(52) U.S. Cl.
  CPC .............. *G06T 2200/04* (2013.01); *G06T 2207/20104* (2013.01); *G06T 2207/30004* (2013.01); *G06T 2210/41* (2013.01); *G06T 2219/004* (2013.01); *G06V 2201/031* (2022.01)

(56) References Cited

FOREIGN PATENT DOCUMENTS

| | | |
|---|---|---|
| JP | 2005-124614 A | 5/2005 |
| JP | 2016-123584 A | 7/2016 |
| JP | 2018-000776 A | 1/2018 |
| WO | 2018/131754 A1 | 7/2018 |

* cited by examiner

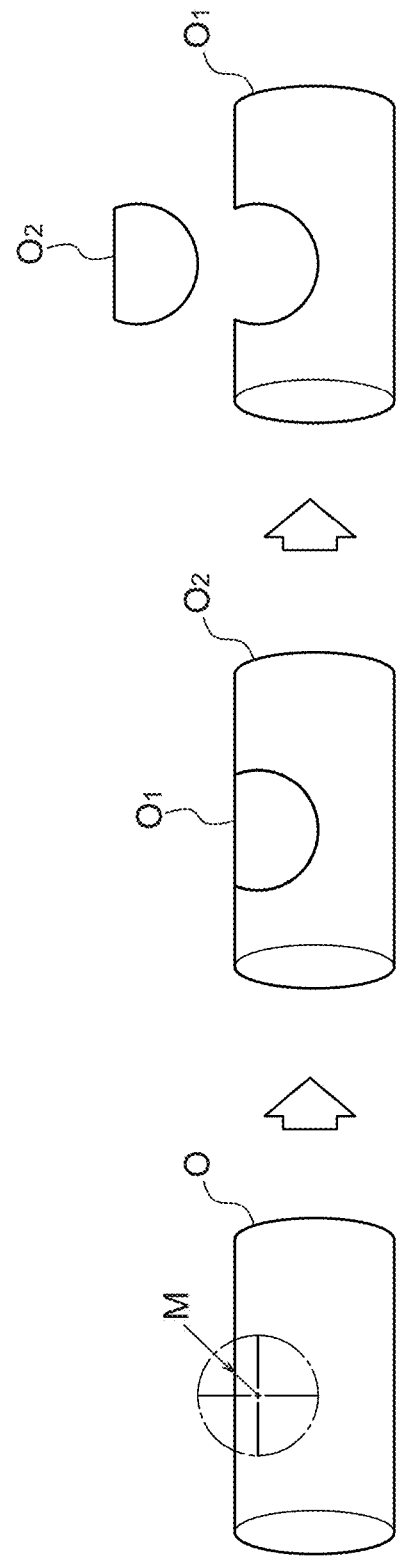

MEDICAL IMAGE PROCESSING DEVICE, MEDICAL IMAGE PROCESSING METHOD, MEDICAL IMAGE PROCESSING PROGRAM, AND SURGICAL SUPPORT SYSTEM

TECHNICAL FIELD

The technology of the disclosure relates to a medical image processing device, a medical image processing method, a medical image processing program, and a surgical support system.

BACKGROUND ART

JP-A No. 2018-776 discloses a technology that displays a display image in which a blood vessel region in an X-ray image is displayed in a different display mode from that of blood vessel regions other than that blood vessel region. The image processing device specifies a blood vessel region in a blood flow direction from a predetermined position in the blood vessel region based on temporal changes in the signal strength of a contrast agent per unit region comprising one or plural pixels in a blood vessel region in plural X-ray images. Then, the image processing device displays a display image in which the specified blood vessel region is displayed in a different display mode, such as a different color, from that of blood vessel regions other than the blood vessel region.

Furthermore, JP-A No. 2005-124614 discloses an image display device that specifies a blood vessel necessary to determine an excision region. The image display device utilizes arbitrary sectional images and three-dimensional medical images of an organ to designate organ constituent pixels, specifies an artery or equivalent blood vessel determined as regulating that organ position, and specifies veins determined as regulating that organ position. Information about the specified blood vessel is displayed by, for example, adding color to a three-dimensional medical image or an arbitrary sectional image in a stacked three-dimensional medical image of the extracted vessel (e.g., paragraph [0013]).

SUMMARY OF INVENTION

Technical Problem

In this connection, before surgery, during surgery, and after surgery, there are many situations where predetermined information is applied to some kind of medical information and multiple healthcare professionals share that medical information. For example, before surgery, multiple healthcare professionals perform a preoperative simulation. In this case, it is preferred, for example, that information representing the incision site be applied to a medical image of the patient on which the surgery is to be performed and that the information about the incision site be shared by the multiple healthcare professionals. Furthermore, during surgery also, it is preferred that information representing the incision site be appropriately applied to a medical image of the patient and that that information be shared by the multiple healthcare professionals and the surgery be performed.

The device disclosed in JP-A No. 2018-776 displays a display image in which the specified blood vessel region is displayed in a different display mode, such as a different color, from that of blood vessel regions other than that blood vessel region. However, the device displays, in a different color from that of other blood vessel regions, a blood vessel region that has been specified based on temporal changes in the signal strength of a contrast agent, and a user who is a healthcare professional cannot easily add color to the medical image.

Furthermore, the device disclosed in JP-A No. 2005-124614 designates an arbitrary organ position (a pixel) and shows a vessel (or vessel position) defined as regulating the organ pixel on a previously extracted vessel three-dimensional medical image or in an arbitrary sectional image. However, this device colors a vessel where the designated pixel is defined as regulating, and a user who is a healthcare professional cannot apply information to a desired place in the medical image.

For this reason, the prior art has the problem that information cannot be easily applied to a desired place in the medical image.

The technology of the disclosure has been devised in view of the above circumstances and provides a medical image processing device, a medical image processing method, a medical image processing program, and a surgical support system with which information can be easily applied to a desired place in a medical image.

Solution to Problem

A first aspect of the disclosure for solving the above object is a medical image processing device that applies information to an organ appearing in a three-dimensional medical image, the medical image processing device including: an acquisition unit that acquires a user operation; a specification unit that specifies, from the three-dimensional medical image in which one or more organs appear, an organ of interest to which to apply information; an application unit that applies predetermined information to the organ of interest that has been specified in the three-dimensional medical image in response to the user operation; and a display control unit that controls a display device so as to display the three-dimensional medical image.

A second aspect of the present disclosure is a medical image processing method that applies information to an organ appearing in a three-dimensional medical image and by which a computer executes a process to: acquire a user operation; specify, from the three-dimensional medical image in which one or more organs appear, an organ of interest to which to apply information; apply predetermined information to the organ of interest that has been specified in the three-dimensional medical image in response to the user operation; and control a display device so as to display the three-dimensional medical image.

A third aspect of the present disclosure is a medical image processing program that applies information to an organ appearing in a three-dimensional medical image, the medical image processing program causing a computer to execute a process to: acquire a user operation; specify, from the three-dimensional medical image in which one or more organs appear, an organ of interest to which to apply information; apply predetermined information to the organ of interest that has been specified in the three-dimensional medical image in response to the user operation; and control a display device so as to display the three-dimensional medical image.

Advantageous Effects of Invention

According to the technology of the disclosure, there is obtained the effect that information can be easily applied to a medical image.

BRIEF DESCRIPTION OF DRAWINGS

FIG. 8 is a drawing for describing a method of applying predetermined information to an organ.

DESCRIPTION OF EMBODIMENTS

Embodiments of the technology of the disclosure will be described in detail below with reference to the drawings.

Surgical Support System of First Embodiment

Figure 1:
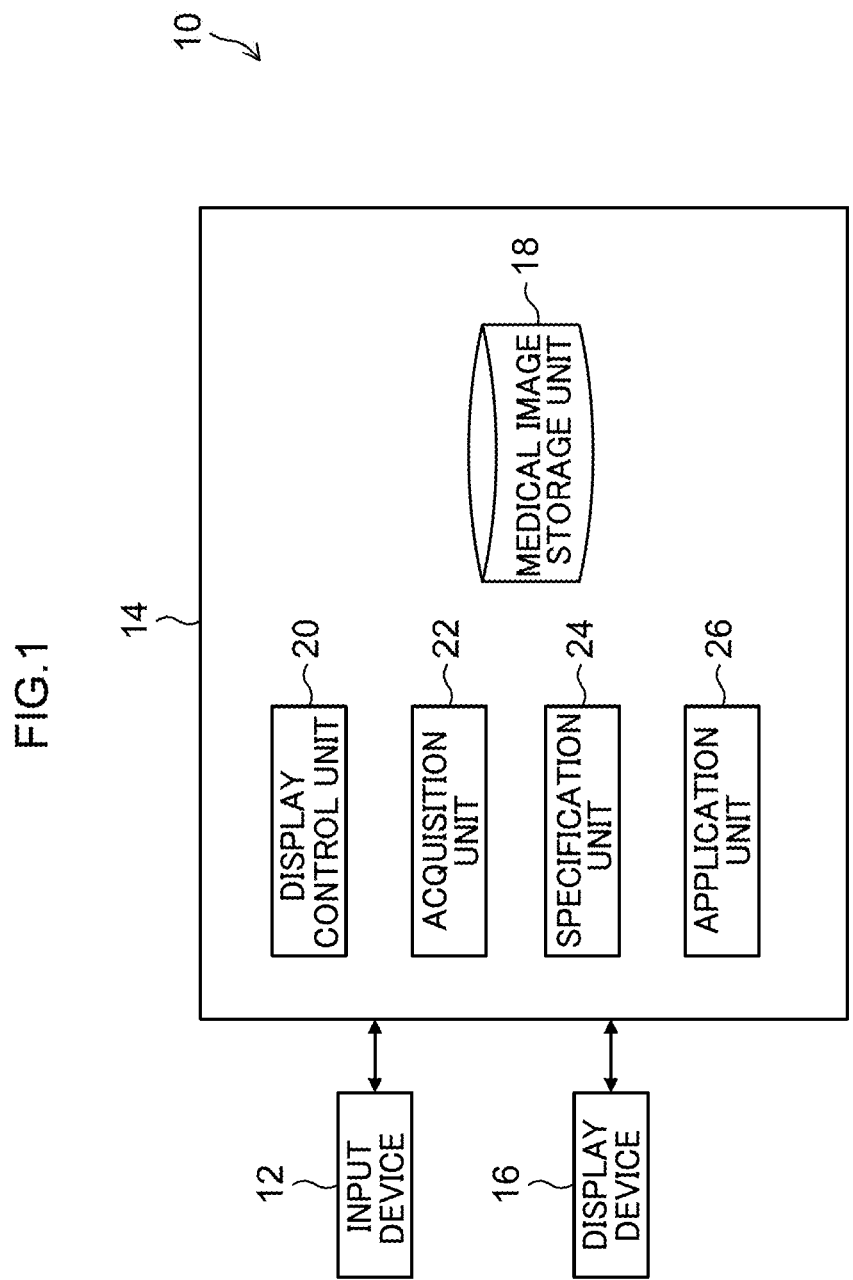
FIG. 1 is a diagram showing an example of the schematic configuration of a surgical support system of an embodiment.

FIG. 1 shows a surgical support system 10 pertaining to a first embodiment. As shown in FIG. 1, the surgical support system 10 of the first embodiment includes an input device 12, a medical image processing device 14, and a display device 16.

The surgical support system 10 acquires operation information from a user and applies predetermined information to a medical image in response to the operation information. Then, the surgical support system 10 displays the medical image to which the information has been applied.

Figure 2:
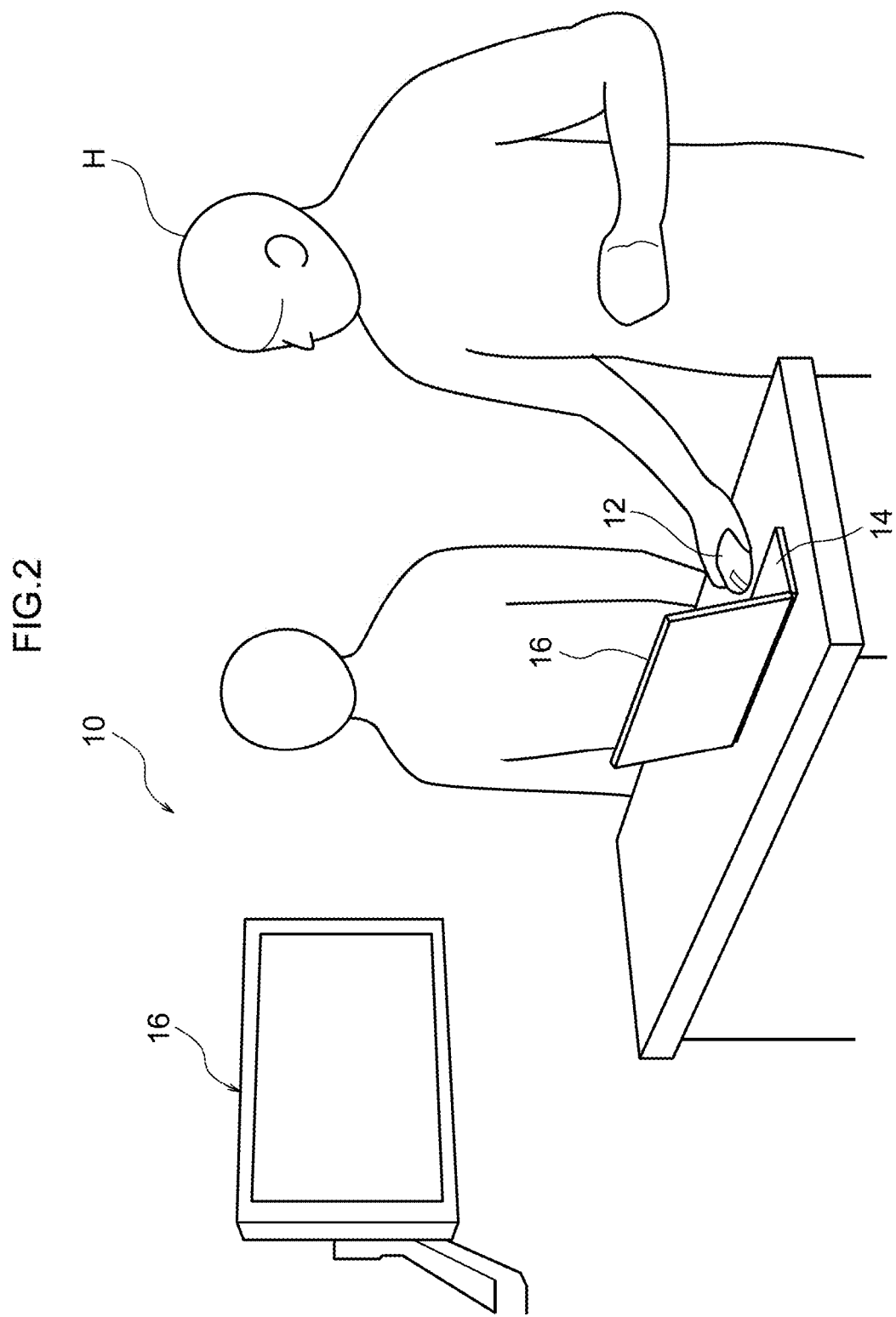
FIG. 2 is a drawing schematically showing an example of a mode of utilizing the surgical support system of the embodiment.
Figure 3:
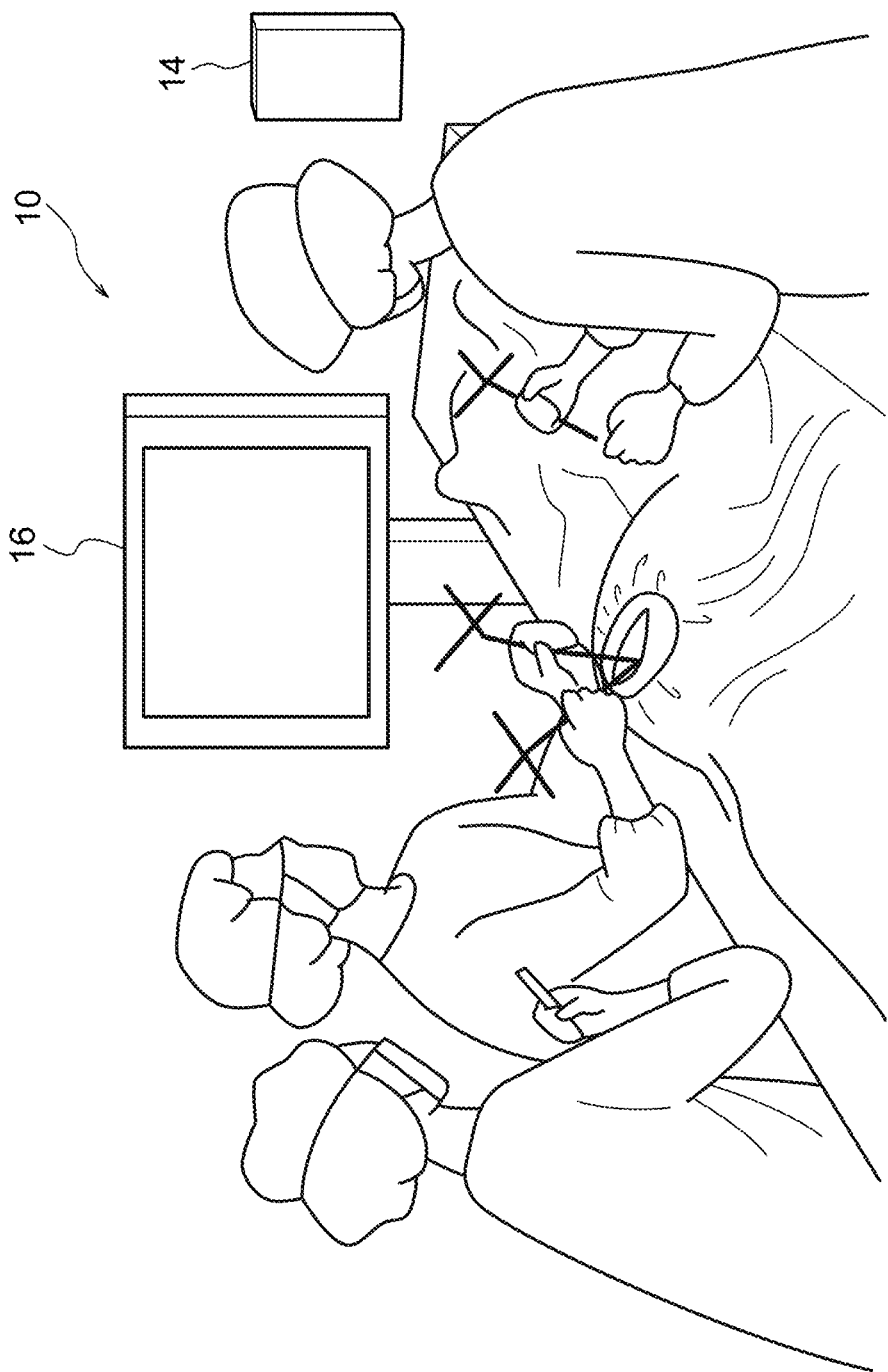
FIG. 3 is a drawing schematically showing an example of a mode of utilizing the surgical support system of the embodiment.

It is assumed that the surgical support system 10 of the first embodiment is utilized in, for example, situations such as shown in FIG. 2 and FIG. 3.

The example of FIG. 2 is a drawing showing a preoperative simulation. As shown in FIG. 2, a healthcare professional H such as a doctor utilizes the surgical support system 10 to perform a preoperative simulation. In this case, the input device 12 of the surgical support system 10 is operated by a given healthcare professional and information is applied to a medical image of a patient. Then, the medical image to which the healthcare professional has applied the information is displayed from the display device 16 of the surgical support system 10. It will be noted that the information applied to the medical image is, for example, at least one of color information, character information, and pattern information. For example, in a case where color information has been applied to an incision site in the medical image of the patient, the fact that that site is to be incised may be shared by multiple other healthcare professionals so that the preoperative simulation can be smoothly performed.

The example of FIG. 3 is a diagram showing a surgery taking place. As shown in FIG. 3, healthcare professionals such as doctors utilize the surgical support system 10 to proceed with the surgery. In this case, the input device 12 (not shown) of the surgical support system 10 is operated by a given healthcare professional and information is applied to a medical image of a patient. Then, the medical image to which the healthcare professional has applied the information is displayed from the display device 16 of the surgical support system 10. Because of this, the incision site may be shared by multiple healthcare professionals so that the surgery can be smoothly performed.

This will be specifically described below.

The input device 12 receives the operation information from a user operating the surgical support system 10. The input device 12 is, for example, realized by a mouse and/or a keyboard. The operation information is information generated in response to the operation of the input device 12 by the user.

The medical image processing device 14 applies information to an organ appearing in a three-dimensional medical image based on the operation information that has been received by the input device 12. It will be noted that one or more organs appear in the three-dimensional medical image.

The display device 16 displays information that has been output from the medical image processing device 14. The display device 16 is, for example, realized by a display.

As shown in FIG. 1, the medical image processing device 14 functionally includes a medical image storage unit 18, a display control unit 20, an acquisition unit 22, a specification unit 24, and an application unit 26. The medical image processing device 14 is realized by a computer such as described later.

The medical image storage unit 18 stores a three-dimensional medical image. It will be noted that each organ appearing in the three-dimensional medical image has an identification label for identifying the organ applied to it beforehand. Here, the organs are, for example, blood vessels. It will be noted that identical identification labels may be applied to each of multiple organs. In the present embodiment, a case where the organs are blood vessels will be described as an example, but the organs are not limited to this and may be any organs.

The display control unit 20 reads the three-dimensional medical image stored in the medical image storage unit 18. Then, the display control unit 20 controls the display device 16 so as to display the three-dimensional medical image it has read.

When the three-dimensional medical image is displayed on the display device 16, the user operates the mouse that is the input device 12 to position the cursor in a desired place appearing in the three-dimensional medical image. Then, for example, by clicking the mouse, the user sets a first designated place representing a designated place that is initially designated on an organ appearing in the three-dimensional medical image.

The acquisition unit 22 acquires the operation information of the user received by the input device 12. Specifically, the acquisition unit 22 acquires the designated place representing the place that is designated on the three-dimensional medical image in response to the user operation. First, the acquisition unit 22 acquires the first designated place in the three-dimensional medical image that has been input by the user.

The specification unit 24 specifies, from the three-dimensional medical image, an organ of interest to which to apply information. Specifically, the specification unit 24 specifies, as the organ of interest from the three-dimensional medical image, the organ positioned at the first designated place that has been acquired by the acquisition unit 22. More specifically, the specification unit 24 specifies, from the three-dimensional medical image, the organ positioned at the acquired first designated place based on the coordinates of the first designated place and the identification label applied to the organ appearing in the three-dimensional medical image.

The user operates the mouse that is the input device 12 to perform an operation to apply information to the organ of interest that has been specified.

Figure 4:
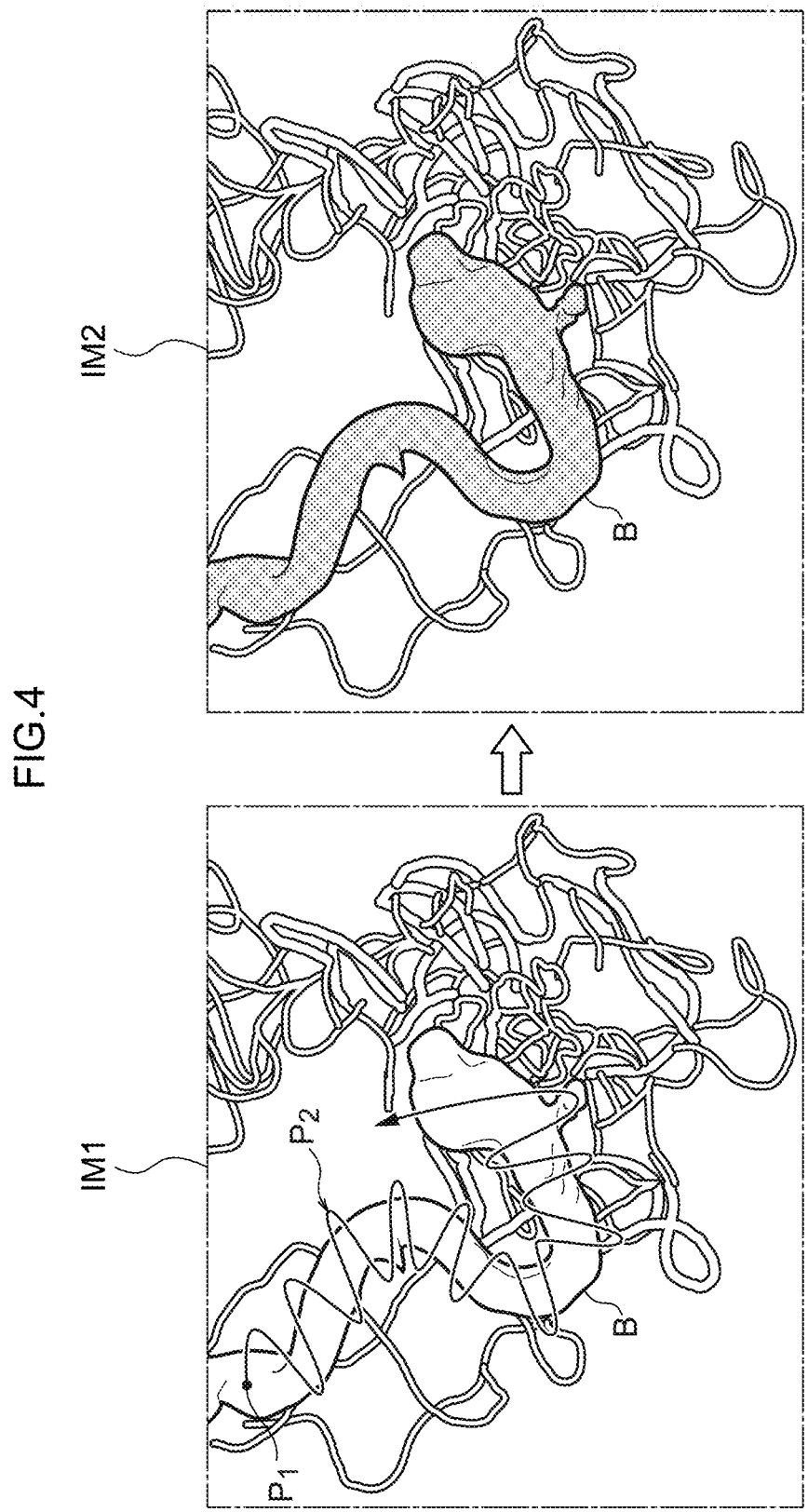
FIG. 4 is a drawing for describing a method of applying predetermined information to an organ.

FIG. 4 shows a diagram for describing a method of applying information to the organ of interest that has been specified. FIG. 4 is a schematic diagram of a three-dimensional medical image showing blood vessels in the brain. For example, as shown in FIG. 4, the user moves the position of the cursor from $P_1$ to $P_2$ and performs an operation to color a blood vessel B that is the organ of interest that has been specified. It will be noted that $P_1$ in FIG. 4 is the first designated place and $P_2$ is a second designated place described later.

The acquisition unit 22 acquires a second designated place representing a designated place that is designated in response to the user operation after the first designated place has been designated. For example, as shown in FIG. 4, in a case where the user has operated the mouse to move the cursor from the first designated place $P_1$ and color the blood vessel B, the places where the cursor is positioned become a series of second designated places Pa.

The application unit 26 applies predetermined information to the second designated places of the organ of interest that has been specified by the specification unit 24. For example, as shown in FIG. 4, in a case where the user has operated the mouse to move the cursor and color the blood vessel B, a color different from that of the other blood vessels is applied to the places of the blood vessel B corresponding to the series of the second designated places. As a result, the places of the blood vessel B corresponding to the second designated places are displayed in a color different from that of the other blood vessels, and three-dimensional medical image IM1 becomes three-dimensional medical image IM2.

Figure 5:
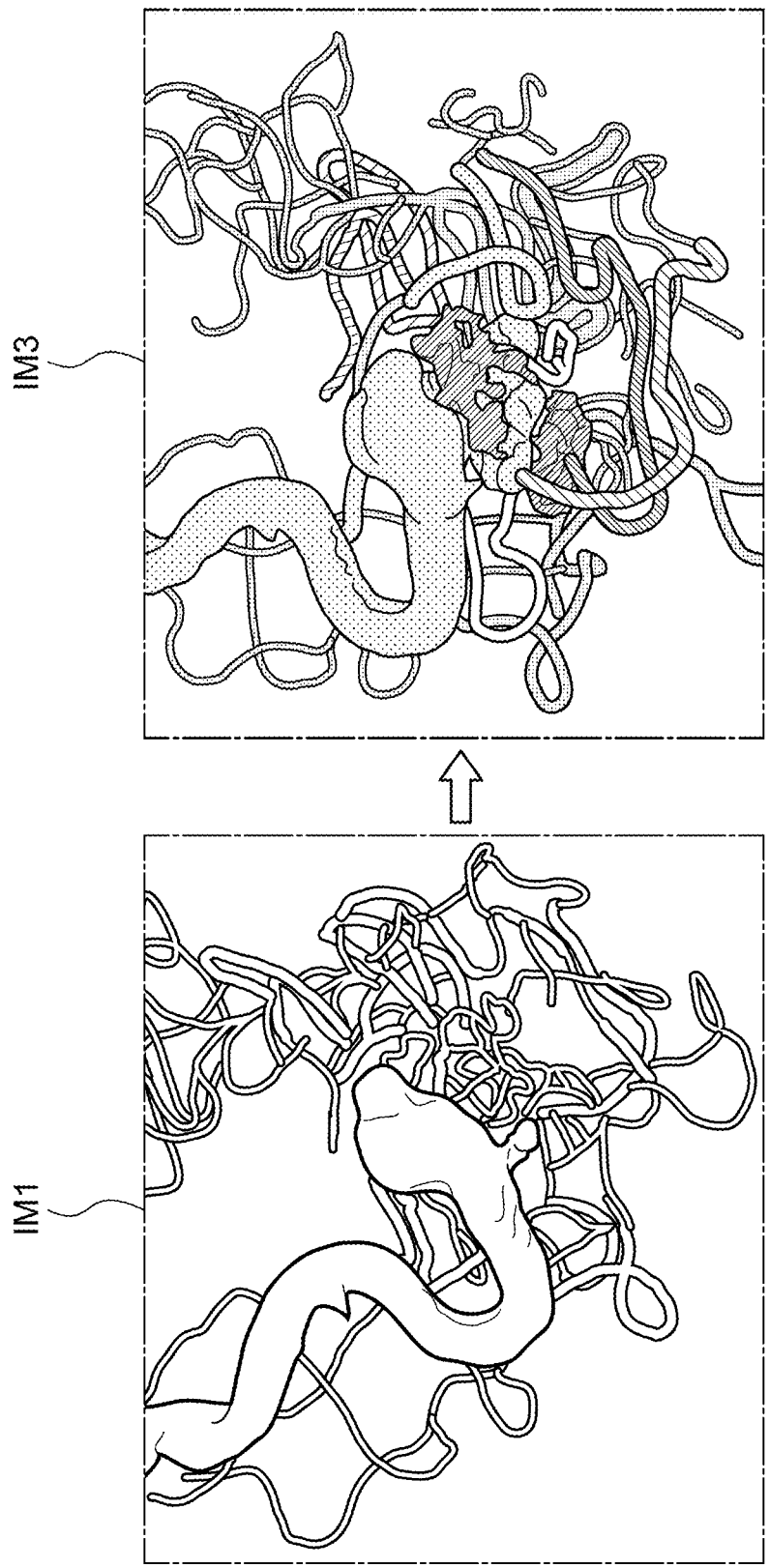
FIG. 5 is a drawing for describing a method of applying predetermined information to an organ.

It will be noted that, in this case, color is not applied to the other blood vessels even if an operation to apply color to the other blood vessels different from the blood vessel B is performed by an operation of the mouse by the user. This is because the other blood vessels different from the blood vessel B are not the organ of interest that was specified by the first designated place. For this reason, only the places of the blood vessel B corresponding to the second designated places are colored and displayed in a color different from that of the other blood vessels. As a result, for example, in a case where the user has colored multiple blood vessels, as shown in FIG. 5, each of the multiple blood vessels is displayed in a different color.

The display control unit 20 controls the display device 16 so as to display the three-dimensional medical image to which the predetermined information (e.g., color) has been applied by the application unit 26.

The display device 16 displays, in accordance with the control by the display control unit 20, the three-dimensional medical image to which the predetermined information (e.g., color) has been applied by the application unit 26.

A user or the like operating the surgical support system 10 checks the three-dimensional medical image displayed from the display device 16 and utilizes it for surgery or the like.

Figure 6:
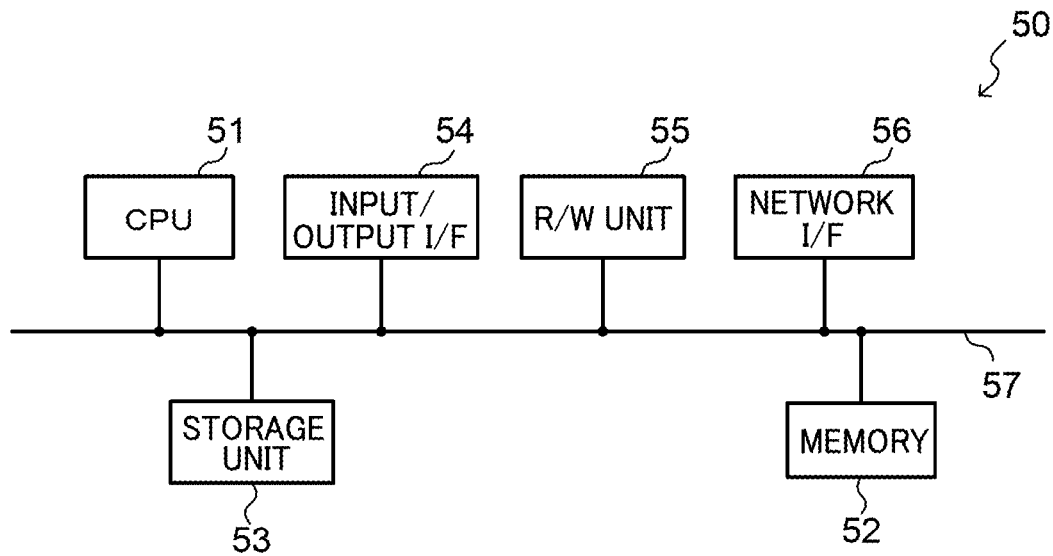
FIG. 6 is a diagram showing an example of a computer that configures a medical image processing device.

The medical image processing device 14 can, for example, be realized by a computer 50 shown in FIG. 6. The computer 50 includes a CPU 51, a memory 52 serving as a temporary storage area, and a nonvolatile storage unit 53. Furthermore, the computer 50 includes an input/output interface (I/F) 54, to which an external device and an output device are connected, and a read/write (R/W) unit 55, which controls the reading of data from and the writing of data to a recording medium. Furthermore, the computer 50 includes a network I/F 56 connected to a network such as the internet. The CPU 51, the memory 52, the storage unit 53, the input/output I/F 54, the R/W unit 55, and the network I/F 56 are connected to each other via a bus 57.

The storage unit 53 can be realized by a hard disk drive (HDD), a solid-state drive (SSD), or flash memory, for example. The storage unit 53 serving as a storage medium stores a program for allowing the computer 50 to function. The CPU 51 reads the program from the storage unit 53, loads it to the memory 52, and sequentially executes processes that the program has.

[Operation of Surgical Support System]

Next, the specific operation of the surgical support system 10 of the first embodiment will be described.

First, the display control unit 20 of the medical image processing device 14 of the surgical support system 10 reads the three-dimensional medical image stored in the medical image storage unit 18 and controls the display device 16 so as to display the three-dimensional medical image it has read. Because of this, the three-dimensional medical image is presented to the user.

The user operates the mouse that is the input device 12 to position the cursor in a desired place appearing in the three-dimensional medical image and, for example, clicks the mouse to set the first designated place on an organ of interest appearing in the three-dimensional medical image.

Figure 7:
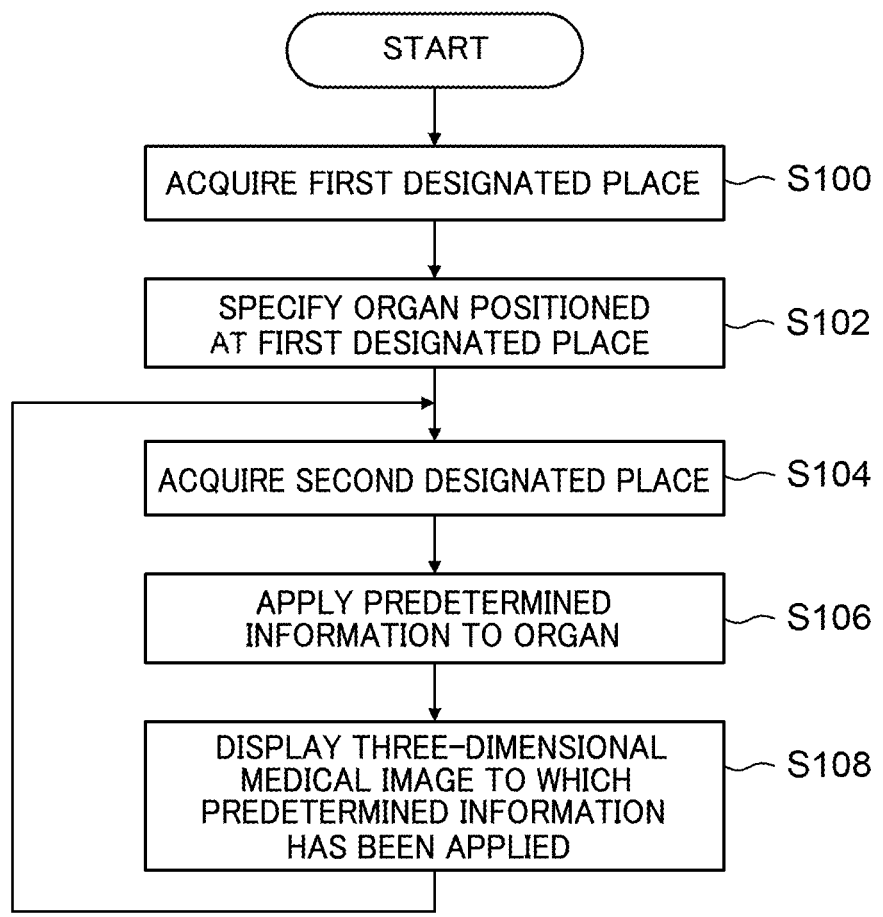
FIG. 7 is a drawing showing an example of a process executed by a medical image processing device of a first embodiment.

The medical image processing device 14, upon receiving the input of the first designated place from the input device 12, executes processes shown in FIG. 7. It will be noted that the medical image processing device 14 executes the processes shown in FIG. 7 each time it receives an input of the first designated place.

In step S100, the acquisition unit 22 acquires the first designated place in the three-dimensional medical image that has been input by the user.

Next, in step S102, the specification unit 24 specifies, from the three-dimensional medical image, the organ positioned at the first designated place based on the coordinates of the first designated place acquired in step S100 and the identification label applied to the organ appearing in the three-dimensional medical image. The organ positioned at the first designated place is specified as the organ of interest to which to apply information.

In step S104, the acquisition unit 22 acquires the second designated place that is designated in response to the user operation after the first designated place acquired in step S100 has been designated.

In step S106, the application unit 26 applies the predetermined information to the second designated place of the organ of interest specified in step S102.

In step S108, the display control unit 20 controls the display device 16 so as to display the three-dimensional medical image to which the predetermined information (e.g., color) has been applied by the application unit 26.

The processes of step S104 to step S108 are repeatedly performed. Because of this, for example, color is applied to the second designated place of the organ of interest specified in the three-dimensional medical image, and the three-dimensional medical image is displayed on the display device 16.

The user operating the medical image processing device 14 checks the three-dimensional medical image that has been output from the display device 16 and utilizes it for surgery or the like.

As described above, the surgical support system 10 of the first embodiment acquires a designated place representing a place that is designated in response to a user operation. The surgical support system 10 specifies, as an organ of interest from a three-dimensional medical image in which one or more organs appear, an organ positioned at the designated place that has been acquired. The surgical support system 10 applies predetermined information to the organ of interest that has been specified. The surgical support system 10 controls a display device so as to display the three-dimensional medical image to which the predetermined information has been applied. Because of this, information can be easily applied to a desired place on the medical image.

Furthermore, the surgical support system 10 of the first embodiment acquires a first designated place representing the designated place that is initially designated in response to the user operation and thereafter acquires a second designated place representing the designated place that is designated in response to the user operation. The surgical support system 10 specifies, as the organ of interest from the three-dimensional medical image, an organ positioned at the first designated place that has been acquired and applies predetermined information to the second designated place of the organ of interest that has been specified. Because of this, information can be easily applied to a desired place on the medical image without the predetermined information being applied to organs different from the organ of interest that has been specified.

Surgical Support System of Second Embodiment

Next, a second embodiment will be described. It will be noted that the configuration of the surgical support system of the second embodiment is the same as that of the first embodiment, so identical reference signs are assigned thereto and description thereof will be omitted.

The surgical support system of the second embodiment differs from that of the first embodiment in that it applies predetermined information to a predetermined range of the designated place that has been designated by the user in the three-dimensional medical image.

The application unit 26 of the second embodiment applies predetermined information to a predetermined range of the designated place of the organ of interest that has been specified by the specification unit 24.

FIG. 8 shows a diagram for describing the operation of the application unit 26 of the second embodiment. As shown in FIG. 8, the application unit 26 of the second embodiment applies color as the predetermined information to a region in a circle that is a predetermined range of the designated place indicated by the mouse cursor M.

At this time, as shown in FIG. 8, the application unit 26 of the second embodiment applies, to a predetermined range of the first designated place of the organ of interest, an identification label different from the identification label of the organ of interest that has been specified. Then, the application unit 26 of the second embodiment makes divisible the organ of interest that has been specified and, for example, as shown in FIG. 8, divides the organ 0 into a first organ 01 and a second organ 02. Because of this, the content of a surgery can be appropriately visualized before surgery and during surgery, for example. Furthermore, information can be appropriately shared by multiple healthcare professionals.

Other configurations and actions of the surgical support system of the second embodiment are the same as those of the first embodiment, so description thereof will be omitted.

As described above, the surgical support system of the second embodiment applies predetermined information to a predetermined range of the designated place of the organ of interest that has been specified. Furthermore, the surgical support system of the second embodiment applies, to the predetermined range of the designated place of the organ of interest that has been specified, an identification label different from the identification label of the organ that has been specified, and thus divides the organ of interest. Because of this, information can be easily applied to a desired place on the medical image.

It will be noted that the technology of the present disclosure is not limited to the embodiments described above and is capable of various modifications and applications within a range that does not depart from the spirit of this invention.

For example, although in the present specification embodiments have been described where the program is installed beforehand, the program may also be stored and provided in a computer-readable recording medium.

It will be noted that the processes that the CPU executed by reading software (a program) in the above embodiments may also be executed by various types of processors other than a CPU.

Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Alternatively, as the processor, a general-purpose graphics processing unit (GPGPU) may also be used. Furthermore, the processes may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in each of the above embodiments, an aspect was described where the program is stored (installed) beforehand in a storage, but the program is not limited to this. The program may also be provided in a form in which it is stored in a non-transitory storage medium such as a compact disk read-only memory (CD-ROM), a digital versatile disk read-only memory (DVD-ROM), and a universal serial bus (USB) memory. Furthermore, the program may also take a form in which it is downloaded via a network from an external device.

Furthermore, the processes in the present embodiments may be configured by a computer or a server equipped with a general-purpose arithmetic processing device and a storage device, and the processes may be executed by a program. The program is stored in the storage device, and the program may also be recorded in a recording medium such a magnetic disk, optical disc, or semiconductor memory and may also be provided through a network. Of course, all other constituent elements also need not be realized by a single computer or server and may be realized by being distributed between multiple computers interconnected by a network.

Furthermore, in the above embodiments, a case where the predetermined information is color information was mainly described, but the predetermined information is not limited to this. For example, the predetermined information applied to the organ may be at least one of color information, character information, and pattern information.

Furthermore, a case was described as an example where, when specifying the organ of interest to which to apply information, the medical image processing device of the above embodiments acquires a designated place that is designated on the three-dimensional medical image in response to the user operation and specifies as the organ of interest an organ positioned at the designated place that has been acquired, but the medical image processing device is not limited to this. For example, the medical image processing device may also be configured so that a candidate list of organs of interest to which to apply information is displayed on the display device 16 and the user selects an organ of interest from the candidate list. In this case, the medical image processing device specifies, as the organ of interest, the organ selected by the user. Alternatively, for example, the organ of interest to which to apply information may be preset, and the medical image processing device may be configured to specify the organ of interest in accordance with that setting information. Then, the medical image processing device applies predetermined information to the organ of interest that has been specified in the three-dimensional medical image in response to the user operation.

Furthermore, in each of the above embodiments, a case where one organ is specified as the organ of interest to which to apply information was described as an example, but the organ of interest is not limited to this. Multiple organs may also be specified as organs of interest to which to apply information. In this case, for example, the user may designate multiple designated places on the three-dimensional medical image or may select multiple organs of interest from a candidate list displayed on the display device 16 as described above.

Furthermore, in each of the above embodiments, a case where the predetermined information is applied to the second designated place was described as an example, but the predetermined information is not limited to this. The predetermined information may also be applied to the first designated place.

All documents, patent applications, and technical standards mentioned in this specification are incorporated herein by reference to the same extent as if each individual document, patent application, or technical standard were specifically and individually indicated to be incorporated by reference.

The invention claimed is:

1. A medical image processing device that applies information to an organ appearing in a three-dimensional medical image, the medical image processing device comprising:
   one or more processors; and
   a memory coupled to the one or more processors, configured to store a medical image processing program when executed by the one or more processors, causes the device to:
   acquire a user operation;
   specify from the three-dimensional medical image in which one or more organs appear, an organ of interest to which to apply information;
   apply color information or pattern information to the organ of interest that has been specified in the three-dimensional medical image in response to the user operation; and
   control a display device so as to display the three-dimensional medical image;
   wherein the medical image processing program further causes the device to:
   acquire a designated place representing a place that is designated in response to the user operation,
   specify as the organ of interest from the three-dimensional medical image, an organ positioned at the designated place that has been acquired, and
   apply the color information or the pattern information to the organ of interest that has been specified,
   wherein the medical image processing program further causes the device to:
   acquire a first designated place representing the designated place that is initially designated in response to the user operation and thereafter acquires a second designated place representing the designated place that is designated in response to the user operation,
   specify as the organ of interest from the three-dimensional medical image, an organ positioned at the first designated place that has been acquired, and
   apply the color information or the pattern information to the second designated place of the organ of interest that has been specified,
   wherein the medical image processing program further causes the device to:
   acquire a series of second designated places, and
   continuously apply the color information or the pattern information to places in the series of the second designated places of the organ of interest that has been specified, in response to the user operation.

2. The medical image processing device of claim 1, wherein the medical image processing program further causes the device to: apply the color information or the pattern information to the first designated place and the second designated place of the organ of interest that has been specified.

3. The medical image processing device of claim 1, wherein the medical image processing program further causes the device to: apply the color information or the pattern information to a predetermined range of the designated place of the organ of interest that has been specified.

4. The medical image processing device of claim 1, wherein:
   identification labels for identifying organs are applied beforehand to the one or more organs appearing in the three-dimensional medical image, and
   the medical image processing program further causes the device to specify as the organ of interest from the three-dimensional medical image, an organ positioned at the designated place that has been acquired, based on the designated place that has been acquired and the identification labels applied to the organs.

5. The medical image processing device of claim 3, wherein:
   identification labels for identifying organs are applied beforehand to the one or more organs appearing in the three-dimensional medical image, and
   the medical image processing program further causes the device to apply to the predetermined range of the designated place of the organ that has been specified, an identification label different from an identification label of the organ of interest that has been specified, and thus divides the organ.

6. The medical image processing device of claim 1, wherein the medical image processing program further causes the device to: apply character information.

7. A surgical support system including the medical image processing device of claim 1.

8. A medical image processing method that applies information to an organ appearing in a three-dimensional medical image, in which a computer executes processing to:
  acquire a user operation;
  specify, from the three-dimensional medical image in which one or more organs appear, an organ of interest to which to apply information;
  apply color information or pattern information to the organ of interest that has been specified in the three-dimensional medical image in response to the user operation; and
  control a display device so as to display the three-dimensional medical image, and
  wherein the computer further executes processing to:
    acquire a designated place representing a place that is designated in response to the user operation,
    specify as the organ of interest from the three-dimensional medical image, an organ positioned at the designated place that has been acquired, and
    apply the color information or the pattern information to the organ of interest that has been specified,
  wherein the computer further executes processing to:
    acquire a first designated place representing the designated place that is initially designated in response to the user operation and thereafter acquires a second designated place representing the designated place that is designated in response to the user operation,
    specify as the organ of interest from the three-dimensional medical image, an organ positioned at the first designated place that has been acquired, and
    apply the color information or the pattern information to the second designated place of the organ of interest that has been specified, and
  wherein the computer further executes processing to:
    acquire a series of second designated places, and
    continuously apply the color information or the pattern information to places in the series of the second designated places of the organ of interest that has been specified, in response to the user operation.

9. The medical image processing method of claim 8, wherein the computer further executes processing to: apply the color information or the pattern information to the first designated place.

10. The medical image processing method of claim 8, wherein the computer further executes processing to: apply the color information or the pattern information to a predetermined range of the designated place of the organ of interest that has been specified.

11. The medical image processing method of claim 8, wherein the computer further executes processing to:
  apply identification labels for identifying organs beforehand to the one or more organs appearing in the three-dimensional medical image, and
  specify as the organ of interest from the three-dimensional medical image, an organ positioned at the designated place that has been acquired, based on the designated place that has been acquired and the identification labels applied to the organs.

12. The medical image processing method of claim 10, wherein the computer further executes processing to:
  apply identification labels for identifying organs beforehand to the one or more organs appearing in the three-dimensional medical image, and
  apply to the predetermined range of the designated place of the organ that has been specified, an identification label different from an identification label of the organ of interest that has been specified, and thus to divide the organ.

13. A non-transitory recording medium storing thereon a medical image processing program that applies information to an organ appearing in a three-dimensional medical image, the medical image processing program causing a computer to execute processing to:
  acquire a user operation;
  specify, from the three-dimensional medical image in which one or more organs appear, an organ of interest to which to apply information;
  apply color information or pattern information to the organ of interest that has been specified in the three-dimensional medical image in response to the user operation; and
  control a display device so as to display the three-dimensional medical image,
  wherein the medical image processing program further causes the computer to execute processing to:
    acquire a designated place representing a place that is designated in response to the user operation,
    specify as the organ of interest from the three-dimensional medical image, an organ positioned at the designated place that has been acquired, and
    apply the color information or the pattern information to the organ of interest that has been specified,
  wherein the medical image processing program further causes the computer to execute processing to:
    acquire a first designated place representing the designated place that is initially designated in response to the user operation and thereafter acquires a second designated place representing the designated place that is designated in response to the user operation,
    specify as the organ of interest from the three-dimensional medical image, an organ positioned at the first designated place that has been acquired, and
    apply the color information or the pattern information to the second designated place of the organ of interest that has been specified, and
  wherein the medical image processing program further causes the computer to execute processing to:
    acquire a series of second designated places, and
    continuously apply the color information or the pattern information to places in the series of the second designated places of the organ of interest that has been specified, in response to the user operation.

14. The non-transitory recording medium of claim 13, wherein the medical image processing program further causes the computer to execute processing to apply the color information or the pattern information to the first designated place.

15. The non-transitory recording medium of claim 13, wherein the medical image processing program further causes the computer to execute processing to apply the color information or the pattern information to a predetermined range of the designated place of the organ of interest that has been specified.

16. The non-transitory recording medium of claim 13, wherein the medical image processing program further causes the computer to execute processing to:
  apply identification labels for identifying organs beforehand to the one or more organs appearing in the three-dimensional medical image, and
  specify as the organ of interest from the three-dimensional medical image, an organ positioned at the designated place that has been acquired, based on the designated place that has been acquired and the identification labels applied to the organs.

17. The non-transitory recording medium of claim 15, wherein the medical image processing program further causes the computer to execute processing to:

apply identification labels for identifying organs beforehand to the one or more organs appearing in the three-dimensional medical image, and apply to the predetermined range of the designated place of the organ that has been specified, an identification label different from an identification label of the organ of interest that has been specified, and thus to divide the organ.

* * * * *